United States Patent
Chen

(10) Patent No.: US 8,851,124 B2
(45) Date of Patent: Oct. 7, 2014

(54) OIL PIPE STOPPER

(76) Inventor: Shu-Hui Chen, Taichung (TW)

(*) Notice: Subject to any disclaimer, the term of this patent is extended or adjusted under 35 U.S.C. 154(b) by 371 days.

(21) Appl. No.: 13/354,342

(22) Filed: Jan. 20, 2012

(65) Prior Publication Data
US 2013/0186500 A1    Jul. 25, 2013

(51) Int. Cl.
*F16L 55/10* (2006.01)

(52) U.S. Cl.
USPC .................. 138/89; 138/90; 138/91; 138/92

(58) Field of Classification Search
CPC ............................ F16L 55/115; F16L 55/11
USPC ............ 138/89, 90, 91, 92; 24/457, 327, 334, 24/326, 458, 481, 455, 16 R, 456, 459, 24/489, 521, 507
See application file for complete search history.

(56) References Cited

U.S. PATENT DOCUMENTS

| | | | | |
|---|---|---|---|---|
| 288,749 A * | 11/1883 | Way | | 24/505 |
| 2,369,671 A * | 2/1945 | Greenberg et al. | | 118/505 |
| 2,397,438 A * | 3/1946 | Schmid | | 285/261 |
| 2,537,703 A * | 1/1951 | Randa | | 248/75 |
| 2,538,485 A * | 1/1951 | Tessier | | 169/90 |
| 3,191,685 A * | 6/1965 | Warne | | 169/90 |
| 3,550,687 A * | 12/1970 | Thaxton | | 169/90 |
| 3,976,141 A * | 8/1976 | Harrington | | 169/90 |
| 4,489,466 A * | 12/1984 | Bakker | | 24/489 |
| 6,772,486 B2 * | 8/2004 | Ellwood | | 24/334 |
| 8,522,826 B1 * | 9/2013 | Shih | | 138/89 |
| 8,662,100 B2 * | 3/2014 | Chen | | 137/315.01 |
| 2012/0199232 A1 * | 8/2012 | Mitchell | | 138/89 |
| 2014/0007386 A1 * | 1/2014 | Liao | | 24/457 |

* cited by examiner

*Primary Examiner* — James Hook

(57) ABSTRACT

An oil pipe stopper includes an upper clamping body, a lower clamping body, and an elastic member. The upper clamping body has a central portion with an upper post, two downwardly slanting portions, and two clamping portions. The clamping portions of the upper clamping body are provided with a first stopping member and an engagement groove. The lower clamping body has a central portion with a lower post, two upwardly slanting portions, and two clamping portions. The lower post is telescopically connected with the upper post. The clamping portions of the lower clamping body are provided with a second stopping member and a third stopping member. The downwardly and upwardly slanting portions are crossed such that the first stopping member faces the second stopping member while the engagement groove faces the third stopping member. The elastic member is mounted between the upper clamping body and the lower clamping body.

3 Claims, 7 Drawing Sheets

OIL PIPE STOPPER

BACKGROUND OF THE INVENTION

1. Field of the Invention

This invention relates to an oil pipe stopper, and particularly to one that can be employed for stopping two different oil pipes, for lowering the expense of purchasing tools, and for ease of carrying and using tools.

2. Description of the Prior Art

Generally, when a car is to be repaired, various kinds of oil pipes of the car have to be detached from the car for facilitating maintenance and after the oil pipes are disassembled, the orifices of the oil pipes must be blocked to prevent oil in the oil pipes from leaking out. There are two types of oil pipes: a single-orifice oil pipe and a double-orifice oil pipe. A conventional way of stopping a single orifice oil pipe, referring to FIG. 1, is to employ an oil pipe clamp 1 that is composed of an upper clamping plate 10 and a lower clamping plate 11 facing each other. The upper clamping plate 10 and the lower clamping plate 11 are pivotally combined together by a pivot 12. A torsional spring 13, which is provided between the upper clamping plate 10 and the lower clamping plate 11, has two ends respectively urging against an inner side of one end of the upper clamping plate 10 and an inner side of one end of the lower clamping plate 11. The other end of the upper clamping plate 10 is provided with a stopping member 100, and the other end of the lower clamping plate 11 is provided with an engagement groove 110 that can hold a single-orifice oil pipe A. Thus, the stopping member 100 at the upper clamping plate 10 of the oil pipe clamp 1 can block the pipe orifice A1 of the oil pipe A, while the oil pipe A can be firmly engaged in the engagement groove 110 of the lower clamping plate 11. By so designing, the oil pipe A can be firmly clamped and held by both the upper clamping plate 10 and the lower clamping plate 11, and the pipe orifice A1 of the oil pipe A can be blocked to stop the oil in the oil pipe A from leaking out. Another conventional oil pipe clamp, being indicated by reference numeral 2 and used for stopping a double-orifice oil pipe B, as shown in FIG. 2, is composed of an upper clamping plate 20 and a lower clamping plate 21 facing each other and pivotally combined together by a pivot 22. A torsional spring 23 is assembled between the upper and the lower clamping plates 20, 21 and has two ends respectively urging against an inner side of one end of the upper clamping plate 20 and an inner side of one end of the lower clamping plate 21. An upper stopping member 200 is provided at an inner side of the other end of the upper clamping plate 20. A lower stopping member 210 is provided at an inner side of the other end of the lower clamping plate 21. Thus, the oil pipe B can be clamped and held by the oil pipe clamp 2, and the pipe orifices B1 at two sides of the head of the oil pipe B can be respectively blocked by the stopping member 200 at the upper clamping plate 20 and the stopping member 210 at the lower clamping plate 21 for preventing the oil in the oil pipe B from leaking out.

However, according to the conventional oil pipe clamps mentioned above, when a car is repaired, two different clamping tools must be prepared for use anytime for matching with two different oil pipes A and B, and this may cause trouble and inconvenience in repairing the car and may increase the expense of purchasing clamping tools.

SUMMARY OF THE INVENTION

The objective of this invention is to offer an oil pipe stopper that can block a single-orifice oil pipe as well as a double-orifice oil pipe to reduce the expense of purchasing tools and facilitate carrying and using tools.

The oil pipe stopper of the present invention includes an upper clamping body, a lower clamping body and an elastic member combined together. The upper clamping body has a central portion, two downwardly slanting portions respectively extending from two sides of the central portion, and two clamping portions respectively formed with the two downwardly slanting portions. The central portion of the upper clamping body is provided with an upper post at its underside. The two clamping portions of the upper clamping body are respectively provided with a first stopping member and an engagement groove. The lower clamping body has a central portion, two upwardly slanting portions respectively extending from two sides of the central portion of the lower clamping body, and two clamping portions respectively formed with the two upwardly slanting portions. The central portion of the lower clamping body is provided with a lower post, corresponding to the upper post, at its topside. The lower post is telescopically connected with the upper post. The two clamping portions of the lower clamping body are respectively provided with a second stopping member and a third stopping member. The two downwardly slanting portions and the two upwardly slanting portions are crossed such that the clamping portions of the upper clamping body are aligned with and positioned lower than the clamping portions of the lower clamping body, such that the first stopping member of the upper clamping body faces the second stopping member of the lower clamping body while the engagement groove of the upper clamping body faces the third stopping member of the lower clamping body. The elastic member is mounted between the central portion of the upper clamping body and the central portion of the lower clamping body to normally exert opposite external forces to the upper clamping body and the lower clamping body.

Specifically, the elastic member is a compression coil spring that can be fitted around the upper post and the lower post, and the central portion of the upper clamping body defines an upper circular positioning groove around the upper pipe to retain one end of the compression coil spring while the central portion of the lower clamping body defines a lower circular positioning groove around the lower post to retain the other end of the compression coil spring.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
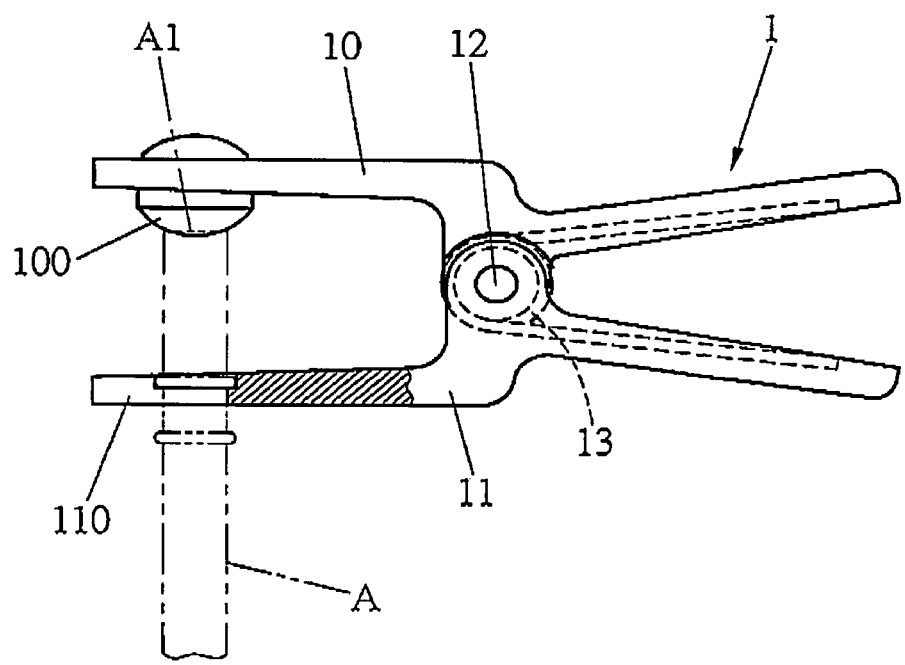
FIG. 1 is a schematic view of a conventional oil pipe clamp used for blocking a single-orifice oil pipe.
Figure 2:
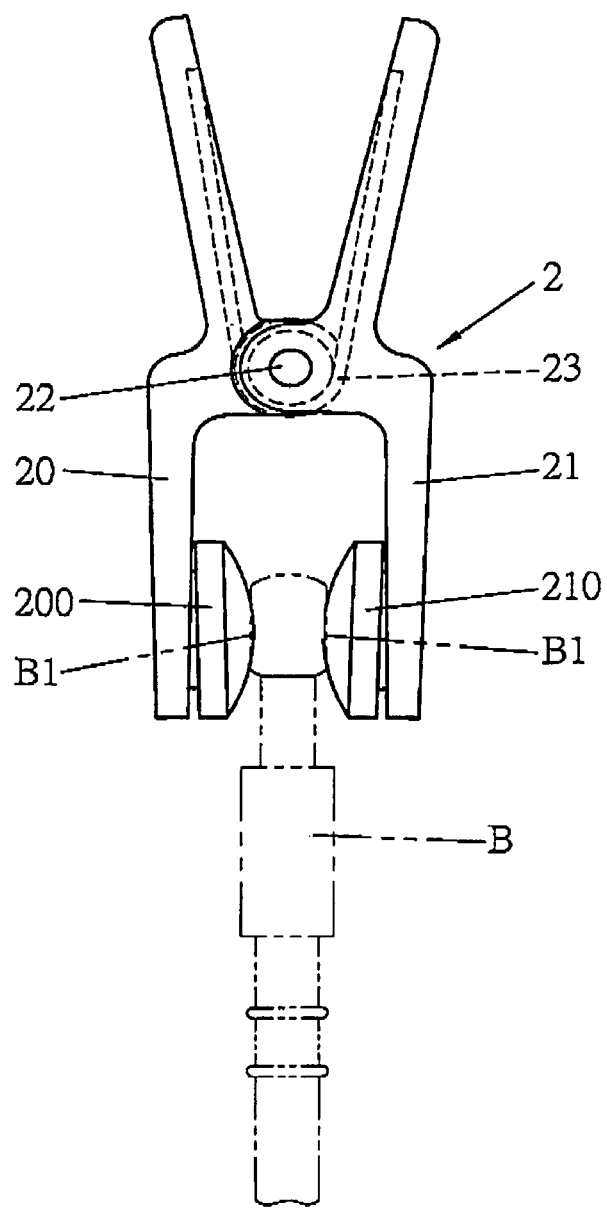
FIG. 2 is a schematic view of a conventional oil pipe clamp used for blocking a double-orifice oil pipe.
Figure 3:
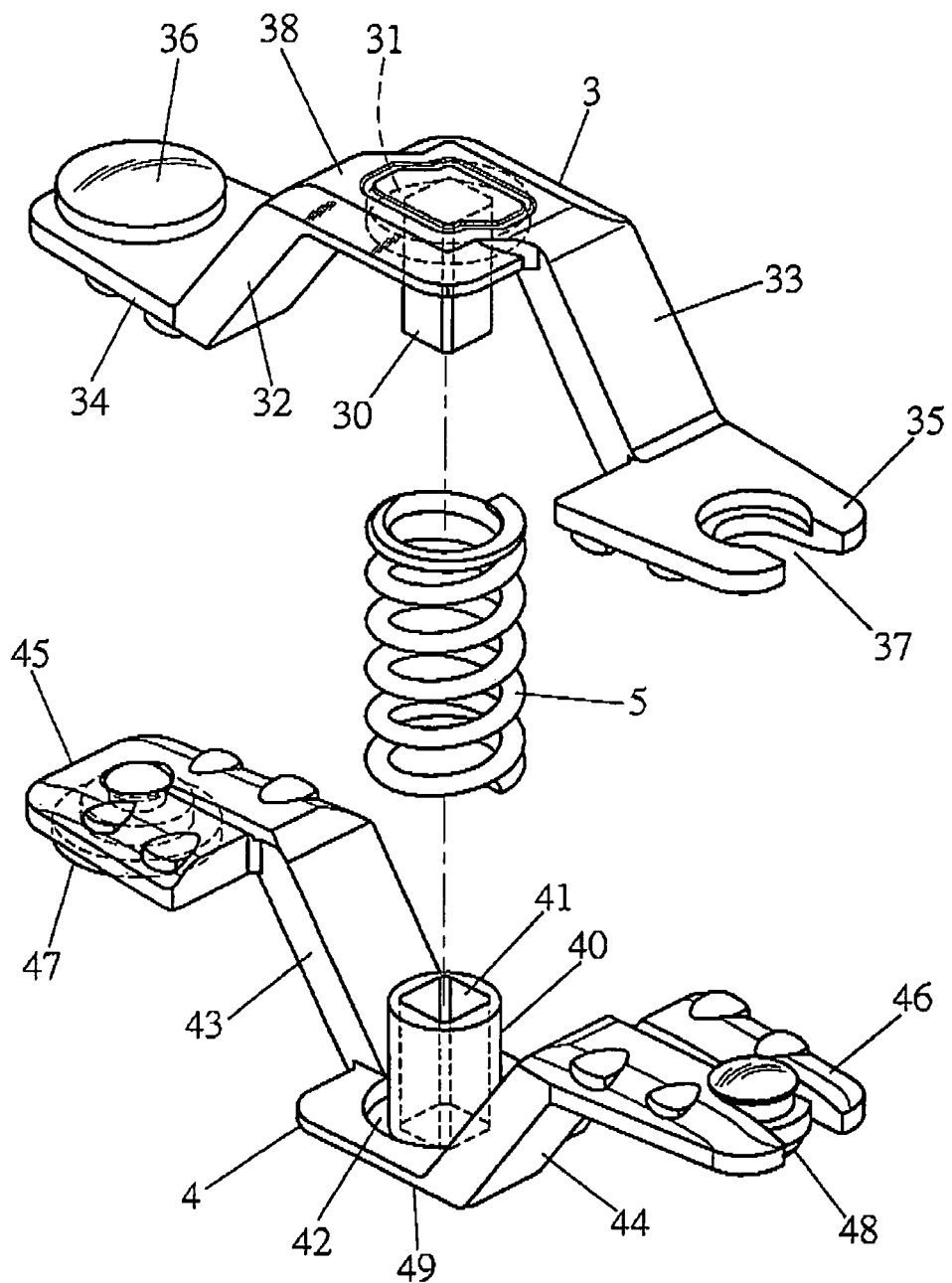
FIG. 3 is an exploded perspective view of one embodiment of an oil pipe stopper of the present invention.
Figure 5:
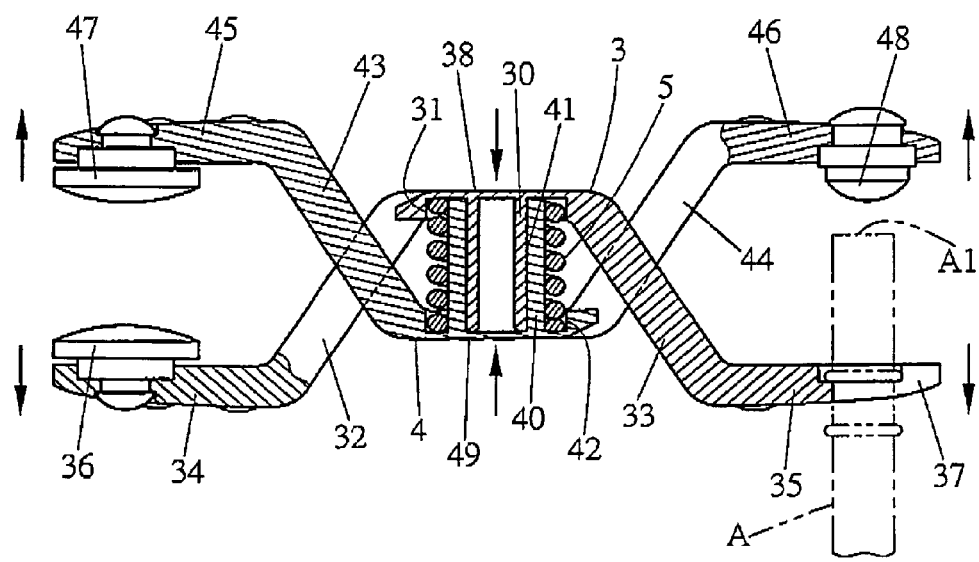
FIG. 5 is a cross-sectional view of the oil pipe stopper of the embodiment of the present invention, which is pressed down for clamping a single-orifice oil pipe.

A preferred embodiment of an oil pipe stopper of the present invention, as shown in FIGS. 3 and 5, includes an upper clamping body 3, a lower clamping body 4 and an elastic member 5 as main components combined together.

The upper clamping body 3 has a central portion 38, two downwardly slanting portions 32, 33 respectively extending from two sides of the central portion 38, and two clamping portions 34, 35 respectively formed with the two downwardly slanting portions 32, 33. The central portion 38 of the upper clamping body 3 is provided with an upper post 30 at its underside. The two clamping portions 34, 35 of the upper clamping body 3 are respectively provided with a first stopping member 36 and an engagement groove 37. Furthermore, the central portion 38 of the upper clamping body 3 defines an upper circular positioning groove 31 around the upper post 30.

The lower clamping body 4 has a central portion 49, two upwardly slanting portions 43, 44 respectively extending from two sides of the central portion 49, and two clamping portions 45, 46 respectively formed with the two upwardly slanting portions 43, 44. The central portion 49 is provided with a lower post 40, corresponding to the upper post 30, at its topside. As shown, the lower post 40 defines therein a guide cavity 41, which can be inserted with the upper post 30. As such, the lower post 40 can be telescopically connected with the lower post 30. The clamping portions 45, 46 of the lower clamping body 4 are respectively provided with a second stopping member 47 and a third stopping member 48, which respectively correspond to the first stopping member 36 and the engagement groove 37. Furthermore, the central portion 49 of the lower clamping body 4 defines a lower circular positioning groove 42 around the lower post 40.

The elastic member 5 is mounted between the central portion 38 of the upper clamping body 3 and the central portion 49 of the lower clamping body 4 to exert opposite outward forces to the upper clamping body 3 and the lower clamping body 4. Specifically, the elastic member 5 is a compression coil spring, which can be fitted around the upper post 30 and the lower post 40, wherein one end of the spring can be retained in the upper circular positioning groove 31 while the other end of the spring can be retained in the lower circular positioning groove 42.

Figure 4:
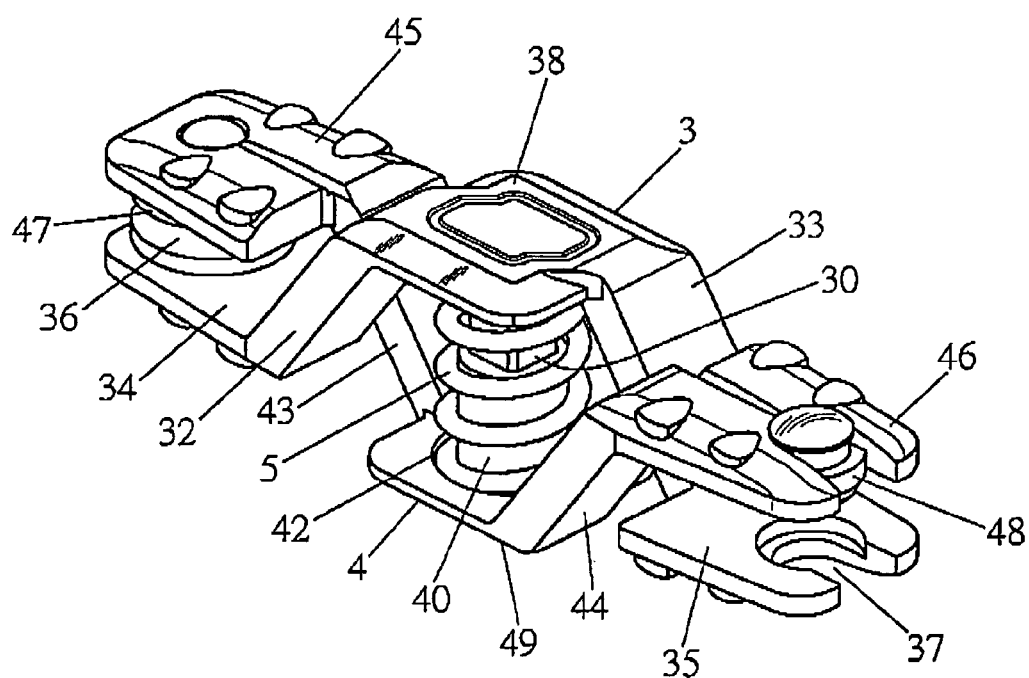
FIG. 4 is a perspective view of the oil pipe stopper of the embodiment of the present invention.

In assembling, referring to FIGS. 3-5, firstly, the elastic member 5 is fitted around the lower post 40 of the lower clamping body 4 and the upper post 30 of the upper clamping body 3, and then, the upper post 30 of the upper clamping body 3 is inserted in the guide cavity 41 of the lower post 40 of the lower clamping body 4, allowing the downwardly slanting portions 32, 33 of the upper clamping body 3 and the upwardly slanting portions 43, 44 of the lower clamping body 4 to be crossed respectively, such that the clamping portions 34, 35 of the upper clamping body 3 are aligned with and positioned lower than the clamping portions 45, 46 of the lower clamping body 4, such that the first stopping member 36 of the upper clamping body 3 faces the second stopping member 47 of the lower clamping body 4 while the engagement groove 37 of the upper clamping body 3 faces the third stopping member 48 of the lower clamping body 4. At this time, the elastic member 5 exerts opposite outward forces to the underside of the central portion 38 of the upper clamping body 3 and the topside of the central portion 49 of the lower clamping body 4, so that the clamping portions 34, 35 of the upper clamping body 3 and the clamping portions 45, 46 of the lower clamping body 4 can be moved inwardly, to allow the oil pipe stopper to be kept in a clamping state.

Figure 6:
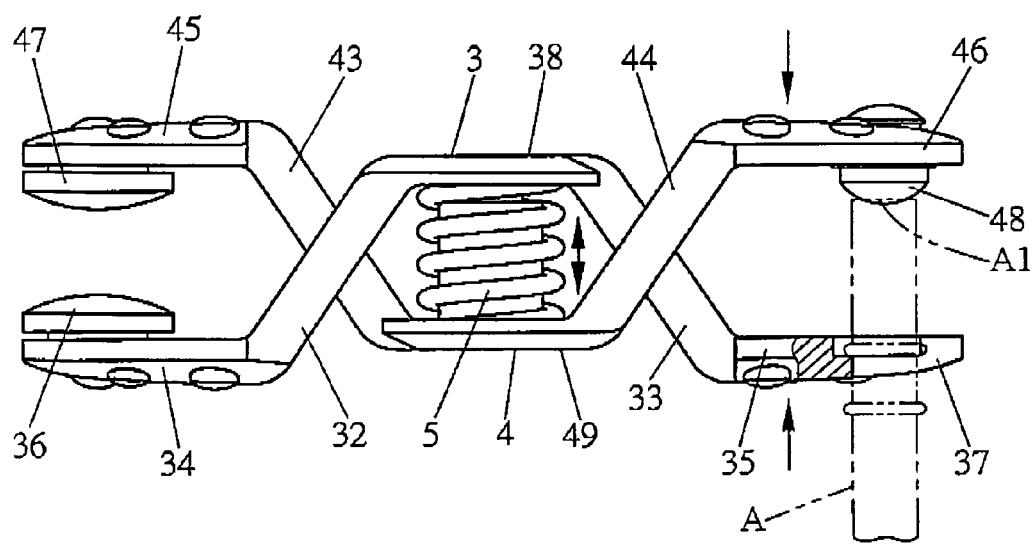
FIG. 6 is a schematic view of the oil pipe stopper of the embodiment of the present invention, which clamps and stops a single-orifice oil pipe.
Figure 7:
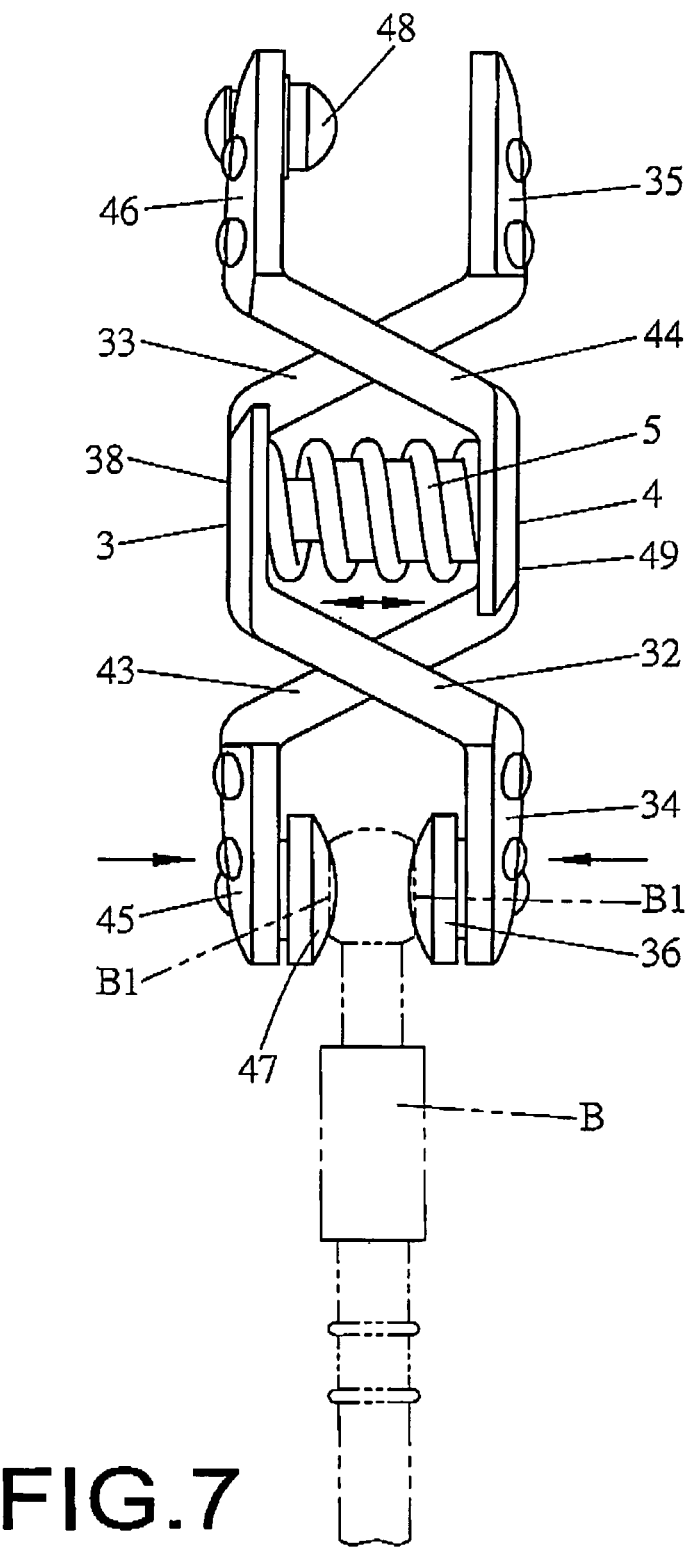
FIG. 7 is a schematic view of the oil pipe stopper of the embodiment of the present invention, which clamps and stops a double-orifice oil pipe.

In using, referring to FIGS. 4-7, the upper clamping body 3 and the lower clamping body 4 of the oil pipe stopper are pressed oppositely, letting the elastic member 5 between the upper clamping body 3 and the lower clamping body 4 stay in an elastically compressed condition and making the clamping portions 34, 35 of the upper clamping body 3 and the clamping portions 45, 46 of the lower clamping body 4 moved outwardly, as shown in FIG. 5, and then, an oil pipe A or B is allowed to be placed between the clamping portions 35 of the upper clamping body 3 and the clamping portion 46 of the lower clamping body 4 or between the clamping portion 34 of the upper clamping body 3 and the clamping portion 45 of the lower clamping body 4. For a single-orifice oil pipe A, when pressing the upper clamping body 3 and the lower clamping body 4, the oil pipe A can be placed in the engagement groove 37 defined at the clamping portion 35 of the upper clamping body 3. When the upper clamping body 3 and the lower clamping body 4 are released from pressing, the elastic member 5 will push the upper clamping body 3 and the lower clamping body 4 to move outwardly, and at the same time, the clamping portions 34, 35 of the upper clamping body 3 and the clamping portions 45, 46 of the lower clamping body 4 will move inwardly to enable the third stopping member 48 at the clamping portion 46 of the lower clamping body 4 to stably block the orifice A1 of the oil pipe A to stop oil in the oil pipe A from leaking out, as shown in FIG. 6. For a double-orifice oil pipe B, when pressing the upper clamping body 3 and the lower clamping body 4, the oil pipe B can be placed between the clamping portion 34 of the upper clamping body 3 and the clamping portion 45 of the lower clamping body 4. When releasing the upper clamping body 3 and the lower clamping body 4 from releasing, the elastic member 5 will push the upper clamping body 3 and the lower clamping body 4 to move outwardly, and at the same time, the clamping portions 34, 35 of the upper clamping body 3 and the clamping portions 45, 46 of the lower clamping body 4 will move inwardly to enable the first stopping member 36 of the upper clamping body 3 and the second stopping member 47 of the lower clamping body 4 to stably block two orifices B1 of the head of the oil pipe B for stopping oil in the oil pipe B from leaking out, as shown in FIG. 7.

By so designing, the oil pipe stopper of the present invention can be employed for stopping two different oil pipes A and B, thereby saving the expense of purchasing tools and facilitating the use and carrying of tools.

While the preferred embodiment of the invention has been described above, it will be recognized and understood that various modifications may be made therein and the appended claims are intended to cover all such modifications that may fall within the spirit and scope of the invention.

What is claimed is:

1. An oil pipe stopper, which comprises:
    an upper clamping body having a central portion, two downwardly slanting portions respectively extending from two sides of the central portion, and two clamping portions respectively formed with the two downwardly slanting portions, wherein the central portion of the upper clamping body is provided with an upper post at its underside, and the two clamping portions of the upper clamping body are respectively provided with a first stopping member and an engagement groove;
    a lower clamping body having a central portion, two upwardly slanting portions respectively extending from two sides of the central portion of the lower clamping body, and two clamping portions respectively formed with the two upwardly slanting portions, wherein the central portion of the lower clamping body is provided with a lower post, corresponding to the upper post, at its topside, the lower post being telescopically connected with the upper post, the two clamping portions of the lower clamping body are respectively provided with a second stopping member and a third stopping member, and the two downwardly slanting portions and the two upwardly slanting portions are crossed such that the clamping portions of the upper clamping body are aligned with and positioned lower than the clamping portions of the lower clamping body, such that the first stopping member of the upper clamping body faces the second stopping member of the lower clamping body while the engagement groove of the upper clamping body faces the third stopping member of the lower clamping body; and an elastic member mounted between the central portion of the upper clamping body and the central portion of the lower clamping body to normally exert opposite outward forces to the upper clamping body and the lower clamping body;

whereby a single-orifice oil pipe is capable of being held in the engagement groove of the upper clamping body and being blocked by the third stopping member of the lower clamping body to prevent oil leakage; a double-orifice oil pipe is capable of being held and blocked by the first stopping member of the upper clamping body and the second stopping member of the lower clamping body to prevent oil leakage.

2. The oil pipe stopper of claim 1, wherein the elastic member is a compression coil spring that is fitted around the upper post and the lower post, the central portion of the upper clamping body defines an upper circular positioning groove around the upper pipe to retain one end of the compression coil spring while the central portion of the lower clamping body defines a lower circular positioning groove around the lower post to retain the other end of the compression coil spring.

3. The oil pipe stopper of claim 2, wherein the lower post defines therein a guide cavity to be inserted by the upper post, so that the lower post is telescopically connected with the upper post.

* * * * *